W. C. MAYO.
CONTROLLING SYSTEM FOR MOTOR TRACTION CARS.
APPLICATION FILED DEC. 29, 1909.

Patented Nov. 1, 1910.

Witnesses
Inventor
William C. Mayo.

UNITED STATES PATENT OFFICE.

WILLIAM C. MAYO, OF BARSTOW, TEXAS, ASSIGNOR, BY DIRECT AND MESNE ASSIGN-
MENTS, OF ONE-THIRD TO ELECTRIC GAS MOTOR CAR COMPANY, A CORPORATION
OF ARIZONA TERRITORY, ONE-THIRD TO GEORGE E. BRIGGS, OF BARSTOW, TEXAS,
AND ONE-THIRD TO JOHN HOULEHAN, OF EL PASO, TEXAS.

CONTROLLING SYSTEM FOR MOTOR TRACTION-CARS.

974,683.                 Specification of Letters Patent.       Patented Nov. 1, 1910.

Original application filed February 24, 1908, Serial No. 417,431. Divided and application filed November 3,
1908, Serial No. 460,828. Divided and this application filed December 29, 1909. Serial No. 535,440.

*To all whom it may concern:*

Be it known that I, WILLIAM C. MAYO, a citizen of the United States, residing at Barstow, in the county of Ward and State of Texas, have invented a new and useful Controlling System for Motor Traction-Cars, of which the following is a specification.

This invention has reference to improvements in controlling systems for motor traction cars and its object is to provide a means for the application of the power to the car axles from a suitable prime mover carried by the car, the control being in a large measure automatic and outside the volition of the motorman, except that the motorman may at will determine the speed of travel of the car.

The present application is a division of another application No. 460,828 filed by me on November 3, 1908 for a controlling system for motor traction cars and the said application of which the present application is a division is in turn a division of an application filed by me for a controller for motor traction cars which ultimately resulted in Letters Patent No. 902,985, granted November 3, 1908.

Figure 1:
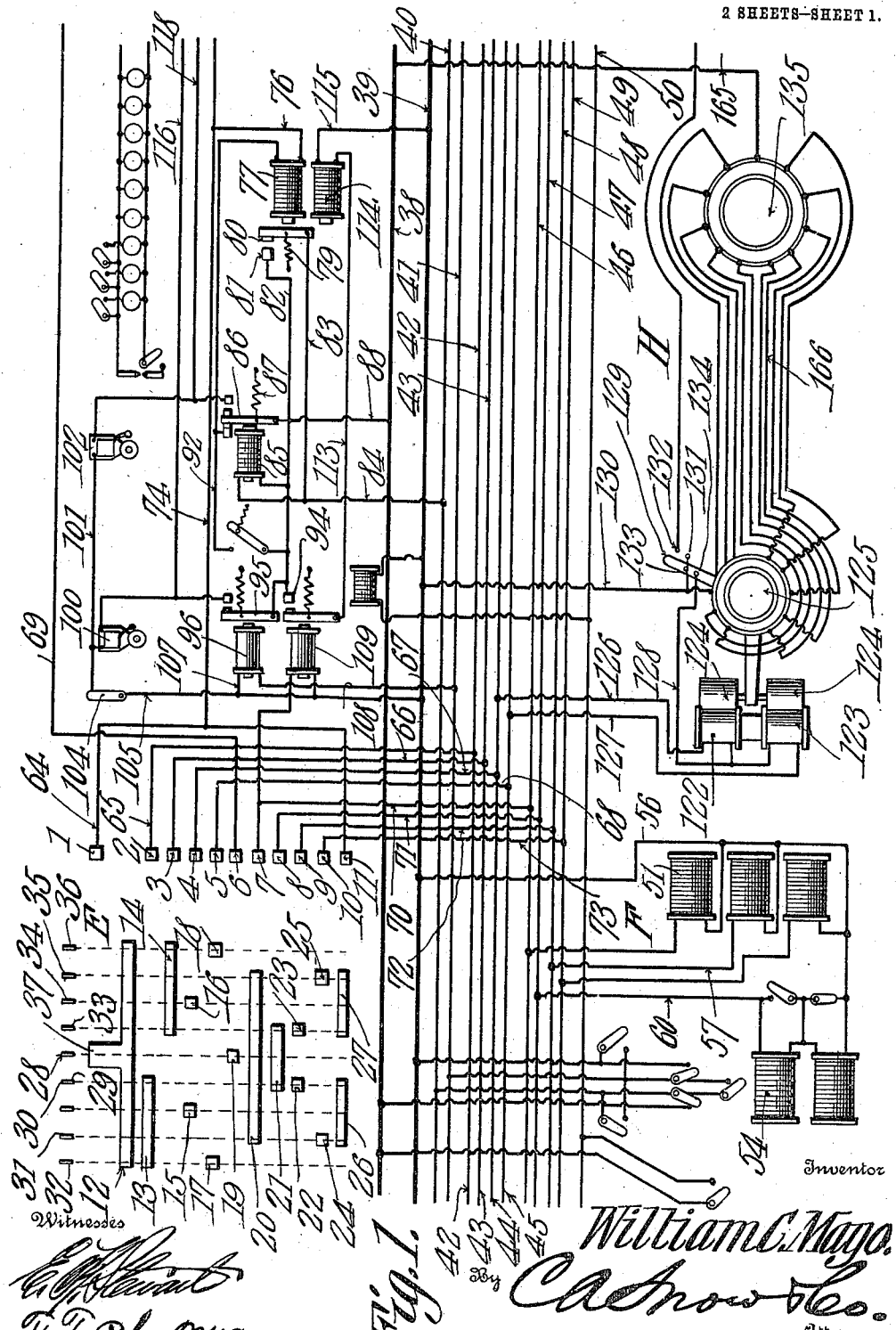
Figure 2:
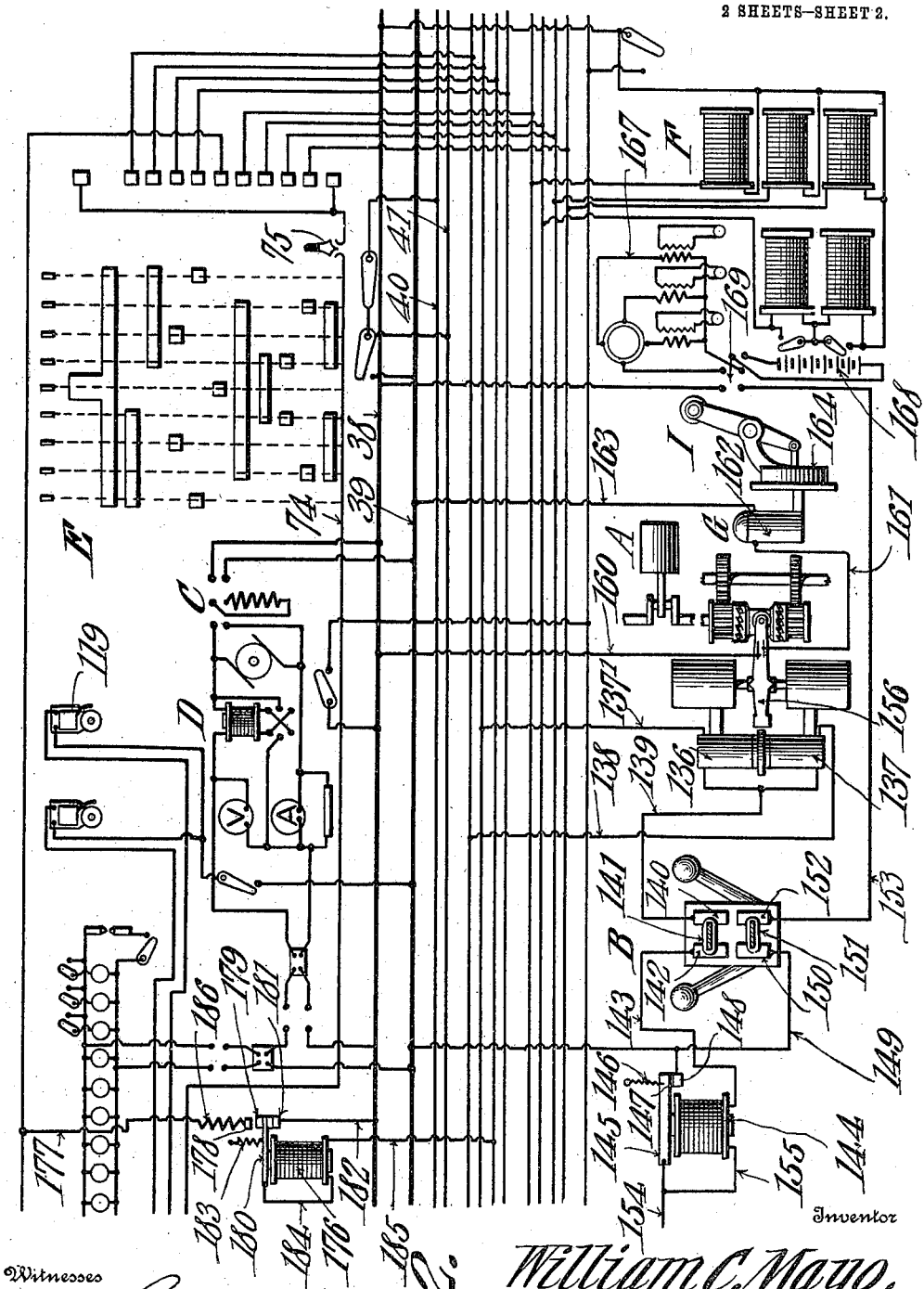

The present invention will be best understood from a consideration of the following detail description taken in connection with the accompanying drawings forming a part of this specification, in which drawings, Figures 1 and 2 taken together illustrate diagrammatically the electrical connections of a single car, showing generally the system of control forming the subject matter of the present application.

In the system to which this invention relates each power car, even when a number of such cars are coupled together to form a train, is provided with a prime mover. If trailers are used, power both mechanical and electrical will be furnished by the power cars, but it will be understood that each trailer may, as well as each power car, be provided with suitable brakes to be electrically operated and such a brake system is shown and described in Letters Patent No. 897,218, granted August 25, 1908, for an electrically operated air brake system, upon an application filed by me.

Each power car is provided with a prime mover A, only diagrammatically indicated in Fig. 2 but which is to be understood as a prime mover of ample power for the purposes of the invention. Because it is desirable that each car should be a complete unit in itself, and also because of the advantages of such an engine, the system contemplates, but of course is not confined to, the use of an explosive engine of the multicylinder type. Because of the track conditions to be met in actual practice and the high speed, say eighty or ninety miles an hour, it is designed to use, especially in long distance traffic, the engine employed may have as many as twelve cylinders or even more if found desirable. The cylinders may be controlled singly or in pairs or otherwise as found most desirable and for this purpose there is provided a governor B, which however is only indicated diagrammatically in the drawings but which is fully shown and described in Letters Patent No. 920,074, granted April 27, 1909, for a governor for explosive engines, on an application filed by myself and John Houlehan.

While not strictly material to the present invention it may be stated that it is desirable that the governor should be inactive to a minimum number of engine cylinders but should be active to the remainder of the engine cylinders by and in accordance with the load put upon the car. It is designed that the prime mover should be continuously operated as long as the car is in service, and this is the reason that the governor is made inactive to a minimum number of engine cylinders so that the speed of the car or the load put upon the prime mover by the car over and above a prescribed load shall not affect the engine except under certain contingencies.

The purpose of providing continuous power upon the car whether the latter be running or not is to insure the generation of electric current for various operations. Each car is provided with a suitable electric generator in the form of a dynamo C preferably of the direct current driven by a suitable engine such as a multi-cylinder explosion engine, and in order that the voltage of the dynamo may be substantially constant there is provided a suitable regulator D such as set forth in Letters Patent No. 896,738, granted August 25, 1908, for improvements in regulators for dynamo electric machines, upon an application filed by myself and John Houlehan. The dynamo and the regulator are only diagrammatically represented in Fig. 2.

Each power car is provided at each end with a suitable controller E, the detail construction of which is shown and described in the aforesaid Letters Patent No. 902,985. Each power car is also provided with a suitable air brake system which however is only shown in this application in so far as the electrical connections are concerned, and these include electro-magnetic means indicated at F for the control of the air brake valves and are to be taken as indicative of the structure set forth in the aforesaid Letters Patent No. 897,218. For reasons which need not be particularly entered into here it is preferred that each car be provided with two air brake systems since the cars, having long bodies, are mounted upon distinct trucks at each end and each truck is provided with its individual air brake system individually controlled by the electrically operated controlling means. Each car is also provided with a speed changing and reversing gear G which however is only indicated in Fig. 2 without any attempt to show its actual structure, the said speed changing gear being fully shown and described in Letters Patent No. 901,980 granted October 27, 1908, for improvements in speed changing gear, on an application filed by myself and John Houlehan. The speed changing gear is electrically operated and the electrical connections are diagrammatically shown at H.

At a suitable point between the power unit and the car wheels there is provided a combined friction and positive clutch, the electrical portions of which are indicated diagrammatically at I, and the details of this clutch are fully shown and described in the aforesaid Letters Patent 901,980 for speed changing gears.

In each controller E there is a series of contact terminals numbered in the drawings 1 to 11 both inclusive, this number being subject to change if under some circumstances it be found advisable to add to or subtract from the parts to be controlled. The movable parts of the controller, that is the movable contacts of the controller are shown in the drawings as displayed and are numbered from 12 to 27 respectively and since it is preferable though not imperative that the parts 12 to 27 be movable while the terminals 1 to 11 be stationary, the said parts 1 to 11 may be termed brushes or terminals and the parts 12 to 27 may be termed contact segments or contactors in order to facilitate the description.

In practice the several contactors or segments 12 to 27 are mounted upon a shaft within a suitable casing and this shaft is designed to have a rotative movement through an arc of about 180 degrees more or less and furthermore the several segments are assumed to be in electrical connection with the said shaft in such manner that the segments are in electrical connection one with the other. By suitable mechanisms such as described in the aforesaid Letters Patent No. 902985, or by any other suitable mechanism the controller may be moved to any one of a number of positions and these positions are indicated in the drawings of this application by the solid and dotted lines designated by the numerals 28 to 36 both inclusive. The brushes 1 to 11 are each of sufficient size to carry the required current safely but none of them is wide enough to bridge the distance between two steps of the controller.

The several segments of the controller are each of sufficient length and they are all so positioned as to carry out the purposes of the present invention and to also cause the energization of the brake controlling devices F.

Running through the length of the car are two main line conductors 38 and 39 receiving current from the dynamo C. Also running throughout the length of the car are other conductors 40 and 41 constituting signal conductors. There are also other conductors 42 and 43 for the reversing clutch and two conductors 44 and 45 for the speed changing gear. There are also four conductors 46, 47, 48 and 49 which constitute the brake controlling conductors, and finally there is another conductor 50 for the whistle, it being understood that it is desirable to provide each car with a whistle which may be blown by air taken from the air brake system or by the exhaust of the engine, the said whistle being used for warning or signal purposes in the same manner as the steam whistle is used upon a steam locomotive. In practice all these several conductors extend through the length of the car and are collected in a bundle or cable and may be thoroughly insulated and protected. Altogether they occupy but little room. At each end the cable of conductors is provided with suitable coupling means of the usual kind which, however, is not shown in the drawings, so that the main or supply conductors and the other conductors which may be termed the train conductors may be made continuous throughout the length of a train when more than one car is used.

It will be observed that the terminal 1 of the controller and the terminal 11 are connected together by a conductor 64. The terminal 2 is connected by a conductor 65 to the conductor 42 constituting one of the reversing clutch conductors, the terminal 3 is connected by a conductor 66 to a conductor 43 constituting the other reversing clutch conductor, the terminal 4 is connected by a conductor 67 to one of the speed changing gear conductors which in this instance is the conductor 44, while the next terminal 5 is connected by a conductor 68 to the other speed changing gear conductor 45. The terminal 6 is connected by a conductor 69 to a corresponding conductor of the other controller at the other end of the car. The terminal 7 is connected by a conductor 70 to the conductor 46 constituting one of the train brake conductors, and the terminals 8, 9 and 10 are respectively connected to the brake conductors 47, 48 and 49 by conductors 71, 72 and 73 respectively. The conductors 64 connecting the end terminals 1 and 11 of both controllers together are connected together by a conductor 74 extending between the two controllers. The continuity of the conductor 74 is broken at any appropriate point and the terminals of this break are normally closed by a suitable bridging plug 75.

As will appear from a consideration of the aforesaid Letters Patent No. 902,985, it will be seen that the plug 75 is contained within the controller structure at each end of the car, so that under proper conditions the circuit may be broken by the removal of the plug, which will result in putting the whole system out of commission, as for instance, when the car is not used. It may be stated that in practice this plug is under the control of a lock accessible only to authorized persons.

In the aforesaid Letters Patent No. 901,980 for speed changing gear there is set forth a structure whereby the speed of transmission between the prime mover and the car wheels will automatically increase or decrease as long as certain circuits are maintained and will cease to either increase or decrease under certain other conditions. In this speed changing gear there are solenoids 122 and 123 controlling an air impelled mechanism 124 arranged to put a rotary switch 125 into and out of action and to cause it to move in either direction. The solenoid 122 is connected by a conductor 126 with the conductor 44 and the solenoid 123 is connected by a conductor 127 with the conductor 45. The other sides of each solenoid 122 and 123 are connected together and by a conductor 128 to an arm 129 carried by the switch 125 but normally not moving therewith.

Current is supplied to the switch 125 through a conductor 130 coming from the dynamo lead 39 and this conductor 130 is branched to a contact 131 adjacent to which is another contact 132. There is also in the branch leading to the contact 131 another contact 133 adjacent to a contact 134 to which the conductor 128 leads, and these two contacts 133 and 134 are normally bridged by the arm 129. As has been explained in the aforesaid Letters Patent No. 901,980, this arm 129 is movable for a very limited distance at the end of the travel of the switch arm in either direction to break the circuit between the contact 133 and 134 and thus deënergize the solenoids 122 and 123 automatically.

The switch 125 is coupled up to the speed changing gear which is only conventionally shown at 135, so that as the switch is moved around over its several contacts the transmission of speed from the prime mover to the car axles is progressively increased or decreased, as the case may be, and this increase or decrease is progressive and automatic at all times.

In connection with the speed changing gear there is a reversing clutch mechanism G conventionally shown in Fig. 2. This clutch is also shown in detail and fully described in the aforesaid Patent No. 901,980. It is only necessary to state herein that this clutch is designed to couple up the speed gear to the car axles to cause them to turn in either direction. The clutch is controlled by two solenoids 136 and 137, the solenoid 136 being connected to the conductor 43 by a branch conductor 137′, and the solenoid 137 being connected to the conductor 42 by a conductor 138, the other sides of the solenoids 136 and 137 being connected in common to a conductor 139 leading to a terminal 140 under the control of the governor B for the prime mover, which governor is, as before stated, shown in detail and fully described in the aforesaid Letters Patent No. 920,074.

The governor forms no part of the present invention in so far as its detail construction is concerned and it is therefore only conventionally shown in the drawings and its operation will be referred to only in so far as may be necessary. The governor controls a bridging conductor 141 in operative relation to the terminal 140, and another terminal 142, which latter is connected by a conductor 143 to one side of a magnet or solenoid 144. This magnet 144 has an armature 145 provided with a spring 146 acting against the pull of the magnet, and the armature also carries a contact 147 in the path of which is another contact 148 connected by a conductor 149 to the dynamo lead or main 39. The conductor 149 is also connected to a terminal 150 under the control of a bridging conductor 151 carried by the governor, and coupling this terminal 150 normally to another terminal 152 coupled to a conductor 153. The armature 145 is connected by a conductor 154 to the terminal 132 before referred to and the other side of the magnet 144 from that connected to the conductor 143 is connected by a branch conductor 155 to the conductor 154.

The clutch mechanism G is provided with an operating arm 156 which carries a bridging conductor arranged to close the circuit between two circuit terminals one of which is connected by a conductor 160 to the dynamo main 39 and the other terminal is connected by a conductor 161 to a solenoid 162 which, in turn, is connected by a conductor 163 to the dynamo main 39. The solenoid 162 controls the clutch actuating mechanism 164 fully shown and described in the aforesaid Letters Patent No. 901,980. It may be here stated with relation to the structure illustrated at I that the clutch controlled thereby is interposed between the prime mover and the speed changing gear and is of a type operating frictionally with predetermined speed and then coupling the parts positively.

In considering the operation of the system as thus far described it is to be understood that the construction of the controller as set forth in the aforesaid Letters Patent No. 902,985 is such that the group of controller switch or contact segments 13 to 19 both inclusive is movable by the controller handle only when the latter is pressed by a downward force exerted by the hand of the motorman, this handle being constructed to have a limited vertical movement, and being capable of rotation about a vertical axis at either extreme of its limited vertical movement.

The controller segments 20 to 27 both inclusive are movable under the action of the controller handle when the latter is at the upper extreme of its vertical movement. Furthermore it is to be understood that the vertical movement of the controller handle is only possible when all the controller sections are in the central or median position and either group of segments can only be operated by the controller handle when the latter is at one extreme or the other of its vertical movement. The segment 12 is rotatable with the controller handle at either extreme of its vertical movement.

Let it be assumed that the engine and dynamo are running but that the car is standing still, and let it further be assumed that the plug or plugs 75 are in position to complete the circuit through the conductor 74. Also let it be assumed that the controllers are in the central position and the motorman has not yet grasped the controller handle. With the controller lever or handle in the central position, there is established a circuit between the dynamo main 39 and the dynamo main 38 by way of the conductor 56, a solenoid 51 constituting the emergency solenoid of the brake system F, a conductor 57, a solenoid 54 constituting the release solenoid of the brake mechanism, and a conductor 60 to the respective train conductors 46 and 47 and by conductors 70 and 71 to the controller contact or switch segments 20 and 21, thence through the controller drums, which latter are not shown in the drawings but are assumed to be present, to the segment 12, and by way of this segment to the conductor 64, thence through conductors 74 and 76, magnet 77, conductor 92, armature 86, to the other dynamo main 38, a magnet 85 controlling the armature 86 and constituting an emergency signal relay magnet, being normally charged. With the parts in the positions described the engine and dynamo are running and the brakes are in full release position, but the car is standing still or its axles are uncoupled from the driving power.

Let it be assumed that the motorman desires to apply power to drive the car in a forward direction. To do this he grasps the controller handle and presses down upon the same so as to couple the upper group of segments 13 to 19 to the controller handle. Under these conditions if the controller handle or lever be moved laterally then the several contact segments at this time connected thereto will participate in the movement. The downward movement of the controller lever handle has caused the elevation of the contact segment 12 until it is coincident with the controller terminal 1, and since the length of the contact segment is sufficient it remains in contact with the terminal 1 throughout the entire sweep of the controller handle in either direction from the median line.

The motorman moves the controller handle in a direction to bring the contact segment 13 into contact with the terminal 2, it being understood that the terminals are in the median line 28. The movement of the controller lever has been sufficient to advance the contactors or segments one step so that the relative position of the upper series of segments and of the fixed brushes or terminals of the controller is as though the fixed brushes had been moved to the position of the line 29. A circuit is then completed through the conductor 65 to the train conductor 42, thence to the solenoid 137 of the clutch mechanism G, and by the conductor 139 to the governor B, bridging conductor 141 and conductor 143 to the solenoid 144, thence by way of the conductor 155 to the conductor 154 and to the contact 132. This last named contact and the contact 131 are under the conditions assumed now bridged by the arm 129, so that the circuit is completed through the conductor 130 back to the dynamo main 39. The solenoid or magnet 144 is thus energized and the armature 145 is drawn toward it so that another circuit through the contacts 147, 148 and the conductor 149 is completed to the dynamo main 39 and the solenoid or magnet 144 is thus maintained energized after the circuit between the contacts 131 and 132 is broken. The solenoid 137 moves the clutch into a position to couple up the speed changing gear for forward movement of the car. But the speed changing gear is not yet in mesh. This mechanism which is fully set forth in the aforesaid Letters Patent No. 901,980, is so arranged that the speed may be progressively raised or lowered by throwing into mesh different sets of gear teeth with pinions coupled to the clutch.

The motorman now moves the controller handle or lever until the fixed brushes of the controller and the movable segments then actuated by the controller handle have the relative position of the line 32. There is then established a circuit by way of the contact segment 17 to the terminal 5 and conductor 68, then to the conductor 45, and by way of the conductor 127 to the solenoid 123, thence by conductor 128 to the arm 129, and by way of the contact 133 with which this arm is now supposed to be connected to the conductor 130 and back to the dynamo main 39.

The solenoid 123 couples up the switch 125 of the speed changing gear to a moving part actuated by the engine in such manner that this switch is caused to make progressive contact with a series of conductors leading to the speed changing gear 135, so as to progressively protrude and retract series of gear teeth at suitable time intervals to cause the speed of the car to be increased progressively so long as the electrical contacts just described are maintained, except that as soon as the switch 125 begins its movement the arm 129 has a slight movement sufficient to disconnect it from the contacts 131 and 132 and complete the circuit to other contacts 133 and 134. The circuit through the electrical side of the speed changing gear mechanism indicated at 135 is from one dynamo main 38 through a conductor 165 to the speed changing gear 135, then by one after the other of the conductors 166 connecting the switch and speed changing gear electro-mechanical parts and back to the dynamo main 39 through the conductor 130. So long as the controller lever is in the position where the connections correspond to the line 32 then the speed constantly picks up until ultimately the maximum speed may be reached, which in practice may be from 80 to 90 miles per hour or a higher speed as may be desired. When this speed is reached there is provision for the breaking of the circuit between the contacts 133 and 134 so that the solenoid 123 may be deënergized and further progressive movement of the switch is stopped automatically. All this is set forth in the aforesaid Letters Patent No. 901,980.

Suppose that the motorman desires to run the car at a speed below the maximum, then when the desired intermediate speed is attained he moves the controller lever or handle to a position where the controller terminals and the segments agree to the line 31, thus breaking the circuit through the solenoid 123 and stopping the movement of the switch 125 so that the speed changing gear remains in the position then attained, and the car will run indefinitely at that speed, or at a speed commensurate with the power supplied at that position of the speed changing gear.

Let it be assumed now that after having caused the car to run at some desired speed, the motorman desires to lower the speed, then he moves the controller lever or handle where the contact terminals and segments will agree to the line 30 thus bringing the contact segment 15 into engagement with the terminal 4 and the conductor 67, which is connected to the train conductor 44, and this in turn is connected by the conductor 126 to the solenoid 122 and the circuit is completed to the conductor 128, contacts 133 and 134, and the conductor 130 back to the dynamo main 39, as before. The switch 125 is now connected up in the reverse direction and the speed changing gear is progressively actuated to lower the speed until a desired lower speed is attained, when by moving the controller arm or lever back to the position where the segment terminals agree with the line 31, this lower speed may be maintained.

In order to stop the car on approaching a regular stop or station, the controller is moved until the segments and terminals agree with the line 30, and beyond that position to the median line 28 which will disconnect the clutch and leave the train moving under its own momentum. After having brought the controller to the median position the pressure on the controller handle is released and the lever or handle moves to the upper limit of its vertical travel thus coupling the lower set of segments to said lever, and then the brakes may be applied, but since this part of the showing forms no part of the present invention it is unnecessary to describe the manner of applying the brakes.

It is to be observed that the movement of the controller lever from the position of full speed to the brake position is in one progressive direction so that the motorman has not to change the direction of movement if he desires to slow down or stop. Also it will be observed that the various positions already described are duplicated so that for running in a reverse direction the motorman has but to proceed with the controller in the manner already described but in a direction opposite to that assumed. When this is done the clutch solenoid 136 is energized instead of the solenoid 137, but the several other operations are the same as before. The solenoid 136 is energized through the segment 14 and its connections. When the motorman desires to make an emergency application of the brakes he may slow down as before and by moving the controller to position 36 the emergency solenoid is cut out of the circuit and the brakes are applied in the manner fully set forth in the aforesaid Letters Patent No. 897,218, since in the triple forming in part the subject matter of the said Letters Patent the emergency application of the brakes is due to the deënergization of the emergency solenoid. If it be further presumed that the car is running and that for any reason the motorman should release the pressure on the controller lever, whether from illness or death or fright or negligence, then the segment 12 will be lowered out of contact with the terminal 1 connected to the conductor 64 and the circuits through the car controlling mechanisms are then all broken so that the prime mover is disconnected from the car axles and the emergency brake solenoid is energized. There is at once an emergency application of the brakes and the car is automatically brought to a standstill in the least possible space and time. This emergency application of the brakes is in the complete system of which this present application for patent forms a part, supplemented by an automatically operating track brake tending to materially shorten the time necessary for the stopping of the car when the brakes are applied under emergency conditions. When the controller handle is released from the central position, then the circuit is maintained through the projection 37 of the segment 12 since the automatic application of the brakes due to the disability or neglect of the motorman is effective only when the car is running.

Should the motorman become careless or attempt to "jockey" with his controller then provision is made whereby the circuit is automatically broken by the governor mechanism as fully set forth in Letters Patent No. 920,074 before referred to, this construction being such that a motorman must bring the speed gear to the lowest point before he can again couple the car up to the prime mover, and this is also true in the case of the emergency application of the brakes while the car is coupled up for running. Should an emergency condition arise when the car is going either at full speed or at some less speed, but still coupled up to the prime mover, then the motorman has but to release the controller handle and the full emergency application will be brought about automatically so that whether the motorman sticks to his post or whether he becomes panic stricken and jumps the emergency application of the brakes will be made in either instance, the prime mover being simultaneously disconnected from the car axles. The controller mechanism is of course duplicated at each end of the car and for the purpose of avoiding the use of train pipes except where used in connection with the usual brake system, the brake mechanisms are duplicated at the two ends of the car and furthermore this avoids the use of brake rigging.

By carrying the train conductors through all the cars of the train and having these cars provided with the several mechanisms described, a single controller on the head car may be made to control all the cars simultaneously.

The invention contemplates the use of a prime mover on each power car with a current generator on each car and a speed controlling mechanism as well as a brake mechanism so that each car is a unit in itself, but may have its electrical connections coupled up to the controller of the head car so that all the several mechanisms work in unison under the control of one motorman. Each dynamo on each car is provided with a suitable regulator and is driven by a suitable prime mover, but it is not deemed necessary to describe the generator circuits in detail since they are fully described in Letters Patent No. 896,738 for the regulator, but it may be stated that these circuits are so arranged that the dynamos of the several cars may be connected up for action in unison and the current will be maintained at a substantially constant voltage by the regulators. As set forth in Letters Patent No. 920,074, the governor is arranged to cut out the sparking circuit of a certain number of engine cylinders when the speed for any reason exceeds a certain predetermined limit. These sparking circuits are indicated generally at 167 while a battery 168 may be used for the purpose of initially starting the engine through a suitable switch 169 so that after the engine has been started the battery may be switched out and the dynamo circuit switched in to maintain the engine in operation and to save the battery. The general car system also includes signal circuits by means of which the conductor may communicate with the motorman and by means of which the conductor or other authorized person may cause the uncoupling of the prime mover from the car axle and the application of the brakes. These features form no part of the present invention, being made the subject matter of another application, and therefore no description thereof is given herein.

There is provided a circuit breaking relay 176, shown in Fig. 2, in connection with the speed changing gear controlling segment 19. The two terminals 6 in the path of the two segments 19 of the two controllers of the car are connected together by a conductor 69 as already explained. Branched off from this conductor is a jumper conductor 177 leading to a contact 178 in the path of a contact 179 carried by an armature 180 for the relay magnet or solenoid 176. In the path of the contact 179 is another contact 181 connected by a conductor 182 to the dynamo lead 38. The armature 180 is under the control of a spring 183 in opposition to the pull of the magnet, and this armature is connected by a conductor 184 to one side of the coil of the magnet or solenoid 176, the other side of which is connected by a conductor 185 to the train wire 44 which latter in turn is connected to the solenoid 122 of the speed changing gear switch 125. The spring 183 tends to maintain the armature 180 with the contact 179 against the contact 178. This connects the segments 19 of both controllers to the speed-down side of the switch 125 of the speed changing gear.

As has already been stated should the motorman shut off power while at high speed the rotary switch 125 will remain at the high speed position and after a quick stop it is not desirable to place the rotary switch on the slow down speed by means of the controller, this controller position being used merely to reduce speed under normal conditions. Should however the motorman start the car with the speed changing gear set for high speed the corresponding load would cause the governor to cut the engine out. When the motorman places the controller on the central or cut-off position the current passes through the relay 176 and this connects the low speed side of the rotary switch 125 to the same side of the circuit that the contact 15 or 16 should connect it. Under these conditions the magnet or solenoid 176 remains in series with a rotary switch controlling solenoid 122 and ultimately the rotary switch is moved to the lowest speed after which the arm 129 automatically opens the circuit, all as set forth in detail in the aforesaid Patent No. 901,980. The rotary switch 125 is so arranged that when the clutch circuit is closed the speed changing gear is still on the first or slowest speed position with the low speed circuit open, and the car may run on such speed indefinitely. If the motorman places his controller in the position to cause the switch 125 to move toward the speed raising position, then just previous to its going to the second speed the rotary switch will close the lowering speed circuit. The solenoid or magnet 122 may not receive enough current to operate all the lowering speed solenoids on a long train. This is of no consequence since just previous to the breaking of the circuit between the terminals 178 and 179 the circuit is completed from the dynamo lead 39 through the terminal 181. To prevent short circuiting on account of the low resistance of solenoid 176, a resistant unit 186 is included in the conductor 177.

No matter at what speed the car or train may be traveling the controller, if placed at off position, will through the solenoid 176 cause the rotary switch 125 to be rotated in a direction to bring it to the lowest speed position, which position is suitable for the starting of the car, and the limited movement of the arm 129 momentarily breaks the circuit, thus demagnetizing the solenoid 176, this break occurring only when the low speed position has been reached.

It is to be especially noted that the closing of the contact terminals 179 and 181 is effected just previous to the opening of the contact terminals 178 and 179 so that the continuity of the circuit is preserved since otherwise the spring 183 would produce a vibration of the armature 180 and thus prevent the proper operation of the solenoid 176. When the branch 182 has been included in the circuit then sufficient current will flow for energizing the solenoid 122. To prevent undue heat, resistance, and so forth the winding of the solenoid 176 must be such as to carry the maximum current for the number of solenoids 122 which will be included in the circuit when the maximum number of cars are included in the train.

In practice the solenoid 176 with the attendant parts may be used in the ballistic form, which may be attained by a small glycerin dash-pot or any other suitable damping device. Since such devices are commercially available it is not deemed necessary to illustrate them.

What is claimed is:—

1. In a system of electric car control, speed changing mechanism between the power side of the car and the car axles, electric controlling means for said speed changing mechanism, and means for establishing electric connection on the lowering speed side of the speed changing mechanism when the main controlling circuit therefor is broken.

2. In a system of electric car control, electrically operated speed changing mechanism, means for establishing electric circuits to actuate the speed changing mechanism to either raise or lower the speed and an electro-magnetically operated circuit controller and circuits therefor for establishing an electric circuit on the lowering speed side of the speed changing mechanism.

3. In a system of electric car control, a source of electric power and power conductors leading therefrom, electrically operated speed changing mechanism, electric circuits for the speed changing mechanism for causing the actuation thereof to either raise or lower the speed, and other means for actuating the lowering side of the speed changing mechanism comprising an electro-magnet, an armature therefor, a circuit through said armature and a magnet to a line conductor leading to the electric side of the speed changing mechanism, a terminal in the path of the armature and connected to one power conductor and a connection between the electric side of the speed changing mechanism and the other power conductor.

4. In an electric system of car control, a source of electric power and power conductors leading therefrom, electrically operated speed changing mechanism, electric circuits for said speed changing mechanism, for causing the actuation thereof to either raise or lower the speed, and other means for actuating the lowering speed side of the speed changing mechanism, comprising an electromagnet, an armature therefor, a circuit through said armature and magnet and to a line conductor leading to the electric side of the speed changing mechanism, a terminal in the path of the armature and connected to one power conductor, a connection between the electric side of the speed changing mechanism and the other power conductor, and means for initially energizing the magnet to move its armature into engagement with said contact.

5. In a system of electric car control, a source of electric power and power conductors leading therefrom, electrically operated speed changing mechanism, electric circuits for said speed changing mechanism for causing the actuation thereof to either raise or lower the speed, and other means for actuating the lowering speed side of the speed changing mechanism comprising an electromagnet, an armature therefor, a circuit through said armature and magnet and to a line conductor leading to the speed changing mechanism, on its electric side, a terminal in the path of the armature and connected to one power conductor, a connection between the electric side of the speed changing mechanism and the other power conductor, and means for initially energizing said magnet to move its armature into engagement with said contact, comprising another terminal in the path of the armature on its movement away from the magnet, a controller, circuit connections established by said controller when in its inactive position for energizing said magnet to attract its armature.

In testimony that I claim the foregoing as my own, I have hereto affixed my signature in the presence of two witnesses.

WILLIAM C. MAYO.

Witnesses:
LEE H. ORNDORFF,
W. F. BECKER.